(12) United States Patent
Nagarajan et al.

(10) Patent No.: US 9,495,376 B2
(45) Date of Patent: *Nov. 15, 2016

(54) CONTENT MIGRATION TOOL AND METHOD ASSOCIATED THEREWITH

(71) Applicant: ACCENTURE GLOBAL SERVICES LIMITED, Dublin (IE)

(72) Inventors: Sai V. Nagarajan, Chennai (IN); Sudhakar Kanakaraj, Tamil Nadu (IN); Sachin Yambal, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/476,311

(22) Filed: Sep. 3, 2014

(65) Prior Publication Data

US 2014/0372872 A1 Dec. 18, 2014

Related U.S. Application Data

(63) Continuation of application No. 12/428,102, filed on Apr. 22, 2009, now Pat. No. 8,862,600.

(30) Foreign Application Priority Data

Apr. 29, 2008 (IN) .......................... 941/MUM/2008

(51) Int. Cl.
*G06F 17/30* (2006.01)
*G06F 17/22* (2006.01)
*G06F 11/20* (2006.01)

(52) U.S. Cl.
CPC ....... *G06F 17/30115* (2013.01); *G06F 11/203* (2013.01); *G06F 17/2247* (2013.01); *G06F17/3015* (2013.01); *G06F 17/30079* (2013.01); *G06F 17/30867* (2013.01); *G06F 17/30067* (2013.01); *G06F 17/3089* (2013.01); *G06F 17/30286* (2013.01); *G06F 17/30595* (2013.01); *G06F 17/30864* (2013.01)

(58) Field of Classification Search
CPC  G06Q 10/10; G06Q 10/063; G06F 17/3087; G06F 17/30864; G06F 3/122; G06F 17/30008; G06F 17/30607; G06F 17/30702; G06F 17/30787; G06F 17/30902
USPC .................................. 707/755, 802; 715/234
See application file for complete search history.

(56) References Cited

U.S. PATENT DOCUMENTS

| 6,938,039 B1 * | 8/2005 | Bober ............... G06F 17/30079 707/704 |
| 2003/0177146 A1 * | 9/2003 | Zimowski ............. G06F 17/303 |

(Continued)

OTHER PUBLICATIONS

Search Report issued in European Patent Application 09158803.8 on Dec. 2, 2009.

*Primary Examiner* — Kuen Lu
(74) *Attorney, Agent, or Firm* — Mannava & Kang, P.C.

(57) ABSTRACT

The instant disclosure describes techniques and devices for facilitating migration of files between a source system and a target system. A system for facilitating migration of files between a source system and a target system includes an extraction component and an injection component. The extraction component includes at least one extraction handler and a profile engine operative to parse a profile specification, execute the at least one extraction handler, and provide a batch specification. The injection component includes a batch handler for obtaining pulled data from a source system, and a batch engine is operative to parse a batch specification and to create at least one file structure in the target system based on extracted structure information in the batch specification. Methods and GUIs for facilitating migration of files are also described.

20 Claims, 6 Drawing Sheets

(56) References Cited

U.S. PATENT DOCUMENTS

| | | | |
|---|---|---|---|
| 2006/0007901 A1* | 1/2006 | Roskowski | H04W 24/00 370/338 |
| 2006/0155575 A1* | 7/2006 | Gross | G06Q 30/0269 705/14.66 |
| 2006/0288048 A1 | 12/2006 | Kamohara | |
| 2008/0033902 A1 | 2/2008 | Glaizel | |
| 2008/0040714 A1* | 2/2008 | Wheeler | G06F 8/63 717/174 |
| 2009/0063556 A1* | 3/2009 | Nemoto | G06F 17/30079 |
| 2010/0185967 A1* | 7/2010 | Noda | G06F 17/30126 715/770 |

\* cited by examiner

CONTENT MIGRATION TOOL AND METHOD ASSOCIATED THEREWITH

PRIORITY

This application is a Continuation of commonly assigned and copending U.S. patent application Ser. No. 12/428,102, filed Apr. 22, 2009, which claims foreign priority to Indian Application Serial Number 941/MUM/2008, filed Apr. 29, 2008, entitled "CONTENT MIGRATION TOOL AND METHOD ASSOCIATED THEREWITH", which is incorporated by reference in its entirety.

FIELD OF THE DISCLOSURE

The instant disclosure relates generally to enterprise content management systems, and in particular, to techniques for migrating content from legacy systems or other enterprise content systems to a new system.

BACKGROUND OF THE DISCLOSURE

The advent of computer systems has changed many aspects of how people accomplish daily tasks, both in their personal lives and in the business world. In personal life, people, for example, communicate via e-mail, store address information in electronic address books, perform banking operations, and draft documents. In the business world, people often resort to computer systems for daily operations such as, for example, communicating via e-mail, drafting documents, storing address information, creating drawings, and maintaining business information such as invoices, bills, bank records, etc.

Despite the many advantages of using computer systems, however, disadvantages exist. For example, many people no longer store hard copies (i.e., paper copies) of the information that they have in the computer system. While this alone is not necessarily a problem, problems may arise, for example, if users do not properly back up the data associated with the electronic information, failing to realize or consider that a hardware failure could cause all data to be lost. In some situations where record retention is critical, such failures can be catastrophic.

Furthermore, if electronic information is not stored with sufficient organization, it can be very difficult to locate needed documents. For example, if a user stores all files in one folder without any type of sorting and perhaps without a structured naming standard, the user may have increased difficulties in locating information.

To overcome these disadvantages, among others, enterprise content management ("ECM") platforms have been developed that help store an unlimited range of content types within a shared repository, often on a corporate network. As an example, one known ECM platform is the "DOCUMENTUM" platform, currently owned by EMC Corporation. ECM platforms allow data to be stored, often on a corporate network accessible by multiple users. Such storage allows a network administrator to back up all corporate data so that the responsibility of maintaining secure and adequate backups is not left in the hands of end users. Among other advantages, ECM platforms allow data to be stored such that users can more easily locate desired files. Furthermore, management features of ECM platforms allow control over files to help ensure that multiple users are not simultaneously changing data stored in files, which could cause data to be lost.

Despite the many advantages associated with ECM platforms, problems exist when transitioning to an ECM platform or from one ECM platform to another. The process of moving files or data from one medium, such as another ECM platform, a database, filesystems, or a proprietary content repository, can be time consuming and cumbersome. Thus, a need exists for an improved content migration method and device.

SUMMARY OF THE DISCLOSURE

The instant disclosure describes techniques and devices for facilitating migration of files between a source system and a target system. In one embodiment, for a profile specification indicating the source system, a corresponding thread is instantiated in a profile queue. Next, a profile engine is instantiated by the corresponding thread to parse the profile specification and execute at least one handler to provide extracted file identification information and extracted structure information from the source system. Thereafter, the profile engine provides a batch specification comprising the extracted file information and the extracted file identification information in standardized form.

In other embodiments, another corresponding thread is instantiated in the profile queue for another profile specification indicating the source system and/or executing at least one handler to provide extracted file metadata.

In yet another embodiment, a corresponding thread is instantiated for a batch specification indicating the target system Thereafter, a batch engine is instantiated by the corresponding thread to parse the batch specification and create at least one file structure in the target system based on extracted structure information in the batch specification. The batch engine then executes at least one handler to provide extracted file content from the source system based on extracted file identification information in the batch specification. Finally, the batch engine copies the extracted file content to the target system in accordance with the at least one file structure.

In an embodiment, one or more suitable devices may be used to implement the processing described herein. Furthermore, a suitable graphical user interface may be employed.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
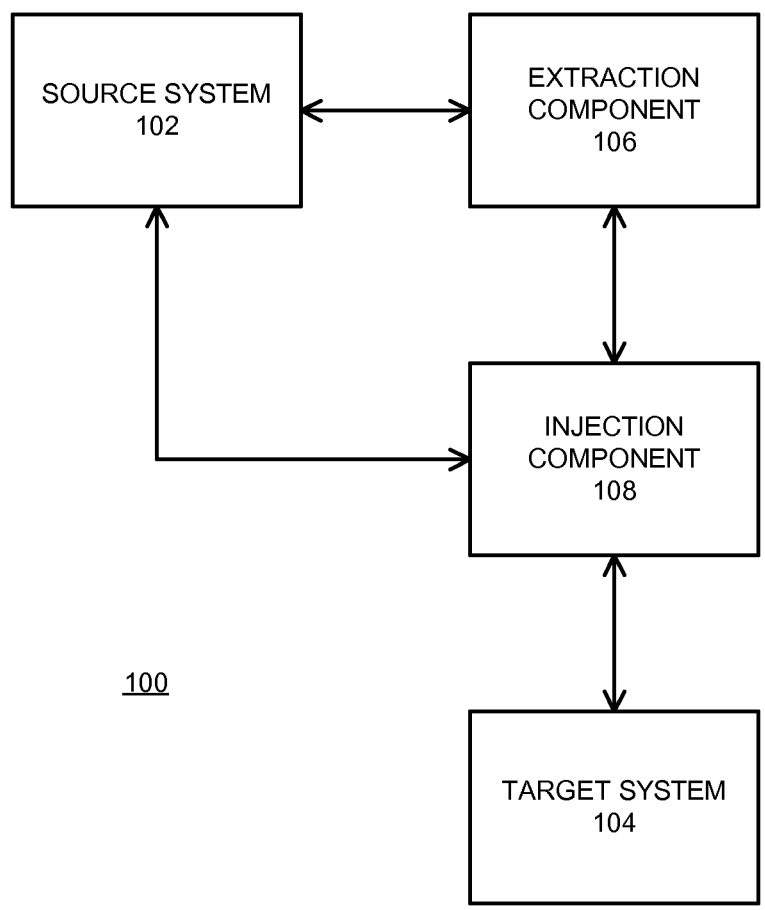
FIG. 1 is a block diagram of a system in accordance with an embodiment described herein.

For the purposes of promoting and understanding the principles disclosed herein, references are now made to the preferred embodiments illustrated in the drawings and specific language is used to describe the same. It is nevertheless understood that no limitation of the scope of the invention is thereby intended. Such alterations and further modifications in the illustrated devices and methods and such further applications of the principles disclosed as illustrated herein are contemplated as would normally occur to one skilled in the art to which this disclosure relates.

FIG. 1 shows a system 100 for facilitating migration of files between a source system 102 and a target system 104. The system 100 also includes an extraction component 106 and an injection component 108. It is understood that the components of the system may be distributed. For example, the source system 102 and the target system 104 may be on the same computer, or they may be located on different computers that are, in turn, in communication with each other via one or more intervening networks or communication paths. Similarly, the extraction component 106 and injection component 108 may be implemented, using known programming techniques, on separate systems, on the source system 102, on the target system 104, or on any number of other independent systems. It is further contemplated that the components, such as the source system 102, the target system 104, the extraction component 106, and/or the injection component 108, may themselves be distributed across multiple computers. Thus, as one skilled in the art will appreciate, the components may be distributed in any suitable manner via any suitable means, such as a wired network (e.g., Ethernet) or a wireless network using any suitable protocol now known or later developed.

Figure 2:
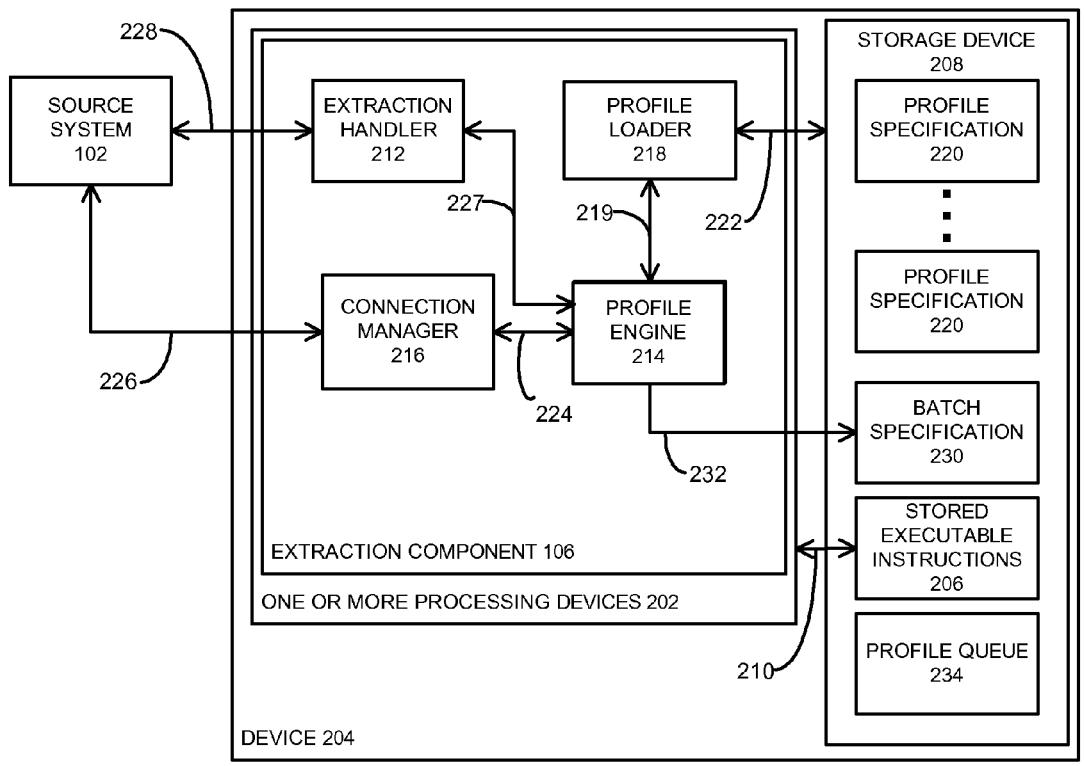
FIG. 2 is a block diagram of a device having an extraction component, illustrated in greater detail, in accordance with an embodiment described herein.

Turning now to FIG. 2, an example of an extraction component 106 is shown. In this particular example, the extraction component 106 is implemented on one or more processing devices 202, which are within device 204. It is understood, however, that the one or more processing devices 202 may be distributed across more than one device. One or more processing devices 202 may include one or more central processing units (CPUs), distributed processing circuitry, application specific integrated circuits (ASICs), state machines, discrete logic, or any other suitable processing circuitry known in the art. In one embodiment of the device 204, the one or more processing devices 202, among other things, execute stored executable instructions 206 stored in a storage device 208. The one or more processing devices 202 may retrieve or send the stored executable instructions 206 or other data from/to the storage device 208. The one or more processing devices 202 may also be operatively connected to a display (not shown in this figure) and send display data to the display and receive user input data from the display in response to this display data.

Storage device 208 may include any type of memory conventionally known in the art, such as random access memory (RAM), read-only memory (ROM), programmable memory (PROM), erasable PROMs (EPROM), electrically erasable PROM (EEPROM), flash memory, magnetic storage devices (e.g., hard disks, floppy disks, magnetic tape), optical disc drives, or any other suitable non-volatile memory now known or later developed. It is further recognized that storage device 208 and/or the one or more processing devices 202 may be distributed. The one or more processing devices 202 may receive stored executable instructions 206 as stored device data 210 from storage device 208 and use the stored executable instructions 206 to instantiate the extraction component 106.

Generally, the extraction component 106 extracts content and metadata from source systems and creates batch specifications, which an injection component 108 may use to perform a file migration. The extraction component 106 includes at least one extraction handler 212 and a profile engine 214. The extraction component 106 may also include a connection manager 216 and a profile loader 218.

In operation, the profile loader 218 retrieves a profile specification 220 from storage device 208, indicated as profile specification data 222. Profile specification 220 may be, for example, a structured extensible markup language (XML) format and indicates the source system 102. Each profile specification may contain, for example, information concerning how to connect to the source system 102, browser component information, content extractor information, attribute extraction information, and other relevant extraction information.

Browser component information, for example, corresponds to a source system 102 and is often used when the source system 102 is an ECM system. One of the capabilities of an ECM system is that it organizes contents in easily locatable directory hierarchies. As such, a browser component handler is one example of an extraction handler 212 and may use browser component information to browse the directory hierarchies of the source system 102. Among other things, the browser component information, along with a browser component handler, allows a user to browse and locate contents and directories on a source system 102 that the user wishes to migrate to a target system 104.

Content extractor information, for example, includes details about fetching content files from source system 102, such as an ECM system or other legacy system. A content extractor component, another example of an extraction handler 212, uses content extractor information to fetch content from source system 102.

Attribute extraction information, for example, includes information used by an attribute extraction handler, which is another example of an extraction handler 212. Some source systems 102, such as ECM systems, bind meta-data (e.g., business data pertaining to content) with the corresponding contents, and the attribute extraction handler, based on the attribute extraction information, can fetch the meta-data corresponding to the contents of source system 102. Among other things, attribute extraction information in a profile specification 220 allows a user to decide which meta-data information should be extracted from the source system 102.

Connection information, for example, is often used when the source system is a database. For example, profile engine 214 may send connection data 224 to connection manager 216, which in turn may use connection data 226 to negotiate a connection with source system 102. The profile specification 220 may also include information about how to handle various objects on the source system. For example, the profile specification 220 may allow a user to define whether to create destination folders if the destination folder does not exist. As another example, many ECM systems allow different versions of a file. The profile specification 220 may allow a user to define whether to migrate the different versions or to only migrate the most recent version. Furthermore, the profile specification 220 may define which extraction handler components 212 should be used during an extraction operation. As one skilled in the art will appreciate, a profile specification 220 can be customized based on any considerations related to a source system 102 and a target system 104. This flexibility, among other things, allows users to use the system 100 with many different types of source systems, which may take the form of a database, a filesystem, an ECM, or any other suitable format.

The profile engine 214 receives the profile specification via profile loader data 219 and parses the profile specification 220, which indicates the source system 102. The profile engine 214 also executes at least one extraction handler 212 to obtain extracted file identification information and extracted structure information from the source system. Each extraction handler 212 defines business rules and business logic pertaining to a user's particular needs during a file migration to an ECM. Profile engine 214 may use one extraction handler 212, as shown in FIG. 2 via extraction handler data 227, but profile engine 214 may use more than one extraction handler 212. The extraction handler 212, for example, communicates with the source system 102 and browses the source system 102.

The extraction handler 212 receives extraction data 228 from the source system 102, which includes, among other things, extracted file identification information and extracted structure information. Extracted file identification information may include, for example, file name information, file types, file formats, version information, metadata, attribute values, permission information, lifecycle information, and other information associated with files stored on the source system 102. Extracted file identification information may include, for example, information relating to the folder or directory hierarchy (e.g., where each file on the source system 102 is stored in relation to other files), as well as information relating to whether new folders should be created on the target system 104 during a migration if the folders do not exist on the target system 104.

The profile engine 214 is also operative to provide a batch specification 230, which includes the extracted file identification information and extracted structure information from the source system 102. In one embodiment, the batch specification 230 indicates a target directory on the target system 104. A user may indicate a target directory on a target system 104 through, for example, a graphical user interface, and the profile engine may include the identified target directory in the batch specification 230. Alternatively, the target system 104 may be indicated by a profile specification 220. As shown in FIG. 2, the profile engine 214 may provide batch specification data 232 to the storage device 208, and the storage device 208 may store the batch specification data 232 as a batch specification 230. Alternatively, although not shown, the profile engine 214 may provide the batch specification 230 to any other suitable component or device, such as injection component 108.

Figure 3:
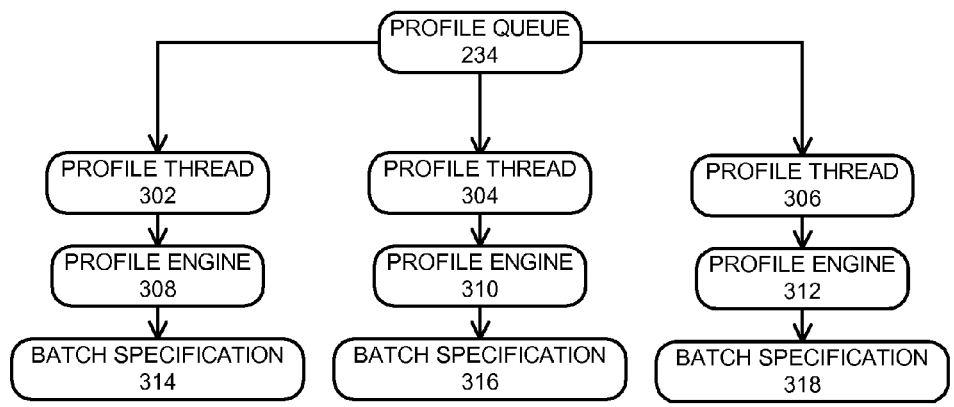
FIG. 3 is a block diagram illustrating an example of a profile queue with multiple threads.

Storage device 208 may also contain a profile queue 234 operatively connected to the one or more processing devices 202. The profile queue 234 contains a plurality of threads representing different extraction operations (i.e., profile or extraction threads). Each one of the threads uniquely corresponds to an instantiation profile engine. That is, the one or more processing devices 202 may instantiate more than one profile engine 214 so that multiple extraction operations simultaneously occur. FIG. 3 shows, for example, three profile threads 302-306, each of which instantiates a corresponding profile engine 308-312. As described above, each profile engine then provides a batch specification 314-318. As one skilled in the art will appreciate, the number of simultaneously executing profile threads may be determined by any suitable means. For example, a user may input a maximum number of allowable profile threads. Alternatively, an application may determine, based on resources of the one or more processing devices 202 and/or storage device 208, a maximum number of profile threads, and this number may fluctuate over time, depending on other operations that may or may not be associated with the file migration. Although not shown, each profile thread 302-306 in the profile queue 234 (and any other profile threads in the profile queue 234) comprise at least one profile specification 208 associated therewith.

Figure 4:
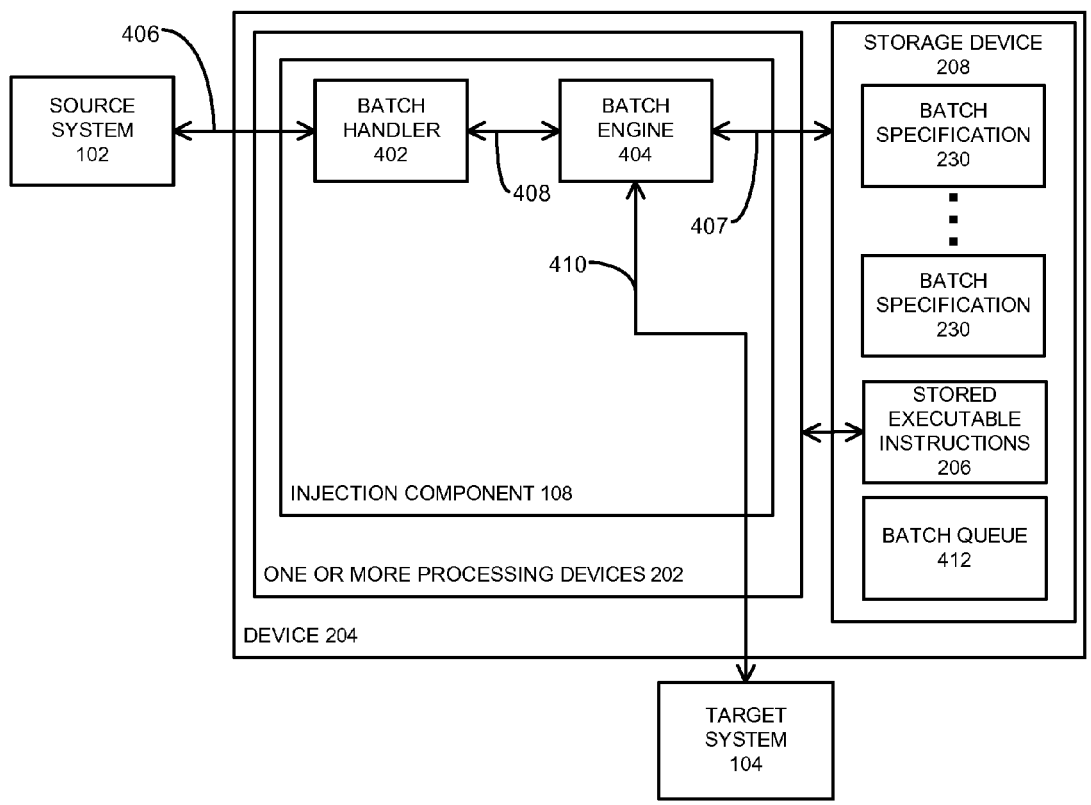
FIG. 4 is a block diagram of a device having an injection component, illustrated in greater detail, in accordance with an embodiment described herein.

Turning now to FIG. 4, an example of an injection component 108 is shown in more detail. Similar to the extraction component 106, the injection component 108 may be an application on one or more processing devices 202, although it could also be implemented in hardware or any suitable circuitry, as described above. The injection component includes a batch handler 402 and a batch engine 404. The batch handler 402 receives source system data 406 from the source system 102. Source system data 406 may include, for example, pulled data, which is the actual data forming the files being migrated from the source system 102.

Batch engine 404 is operative to receive a batch specification 230 as batch specification data 407 and parse it. Based on extracted structure information in the batch specification 230, the batch engine 404 creates at least one file structure in the target system 104. In other words, the batch engine 404 may create folders or cabinets on the target system 104. Furthermore, the batch engine 404 is operative to receive the pulled data (i.e., extracted file content), which may be part of the batch handler data 408 passed from the batch handler 402 to the batch engine 404. The batch engine 404 is operative to copy the pulled data into the target system 104, which may be passed to the target system as a portion of the batch engine data 410. Among other things, the batch engine 404 may also update extracted metadata and other relevant information on the target system 104. Other relevant information may include, for example, business policy information, lifecycle information, version information, rendition information, virtual document information, security/access control information, relation information, or any other information used in ECM platforms.

Figure 5:
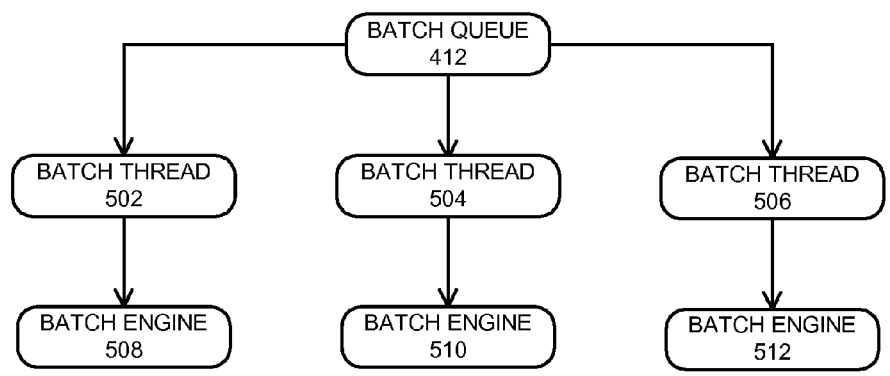
FIG. 5 is a block diagram illustrating an example of a batch queue with multiple threads.

Storage device 208 may also contain a batch queue 412 operatively connected to the one or more processing devices 202. The batch queue 412 contains a plurality of threads representing different injection operations (i.e., batch threads or injection threads). Each one of the threads uniquely corresponds to an instantiation of a batch engine 404. That is, the one or more processing devices 202 may instantiate more than one batch engine 404 so that multiple injection operations simultaneously occur. FIG. 5 shows, for example, three batch threads 502-506, each of which instantiates a corresponding batch engine 508-512. As described above, each batch engine 508-512 receives a batch specification 230 (which may all be different). Using multiple batch engines allows an injection operation to occur for different files from one or more source systems or even to allow injection operations to simultaneously copy pulled data to multiple target systems (not shown).

As one skilled in the art will appreciate, the number of simultaneously executing batch threads 502-506 may be determined by any suitable means. For example, a user may input a maximum number of allowable batch threads. Alternatively, an application may determine, based on resources of the one or more processing devices 202 and/or storage device 208, a maximum number of batch threads, and this number may fluctuate over time, depending on other operations that may or may not be associated with the file migration. Although not shown, each batch thread 502, 504, 506 in the batch queue 412 (and any other batch threads in the batch queue 412) comprise at least one batch specification 230 associated therewith.

Figure 6:
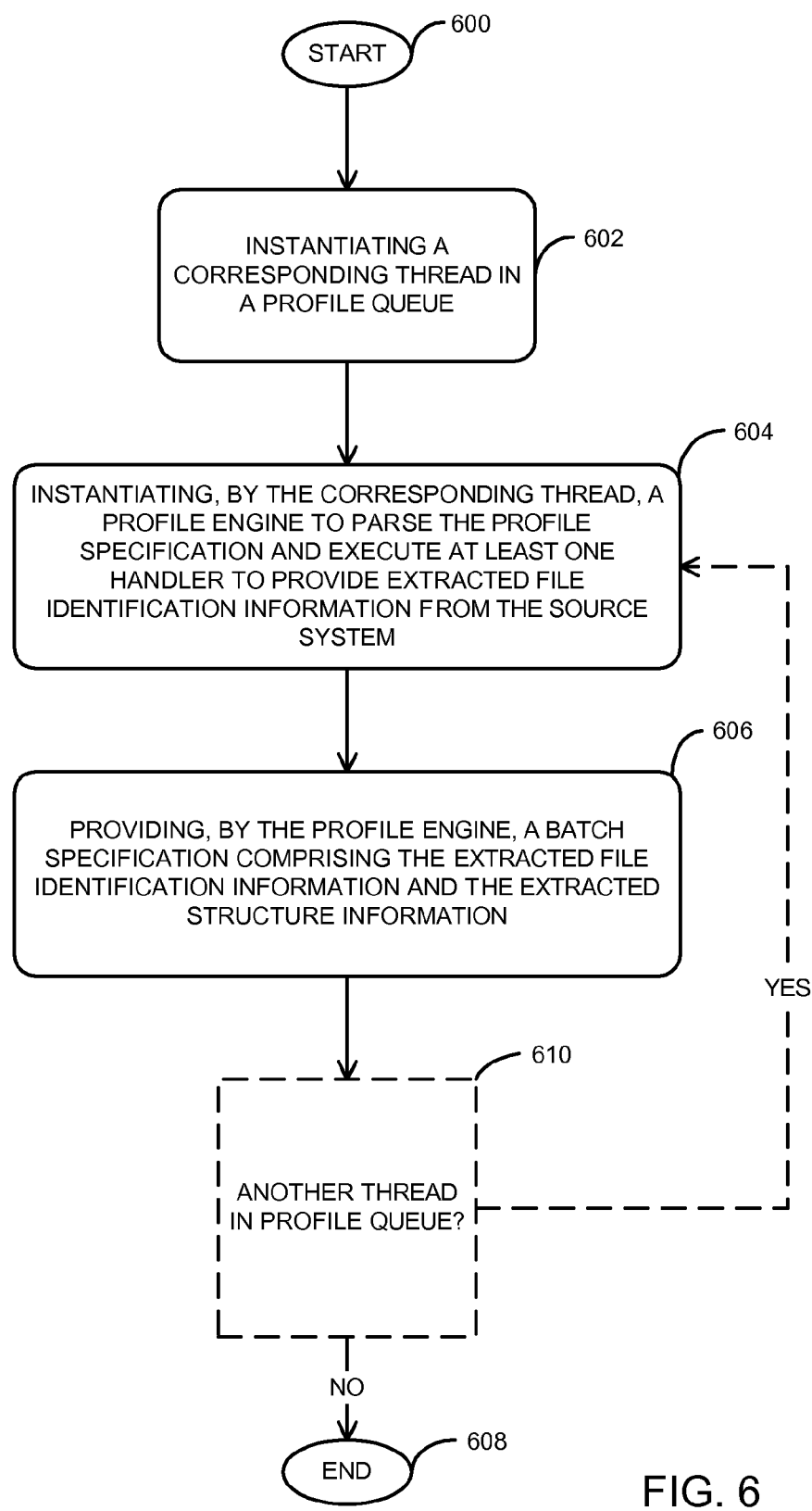
FIG. 6 is a flowchart illustrating a method for facilitating file migration from a source system to a target system in accordance with an embodiment described herein.

Turning now to FIG. 6, a method for facilitating migration of files between a source system 102 and a target system 104 is shown. It is understood that, for this method and all other methods disclosed herein, the steps may occur in any suitable order and may further include additional steps before, after, or between the disclosed steps. Furthermore, the disclosed methods may be implemented by any suitable system or device, such as device 204. For example, a device for facilitating migration of files between a source system 102 and a target system 104 may include one or more processing devices 202 and at least one storage device 208 thereon having stored executable instructions that, when executed by the one or more processing devices, cause the one or more processing devices to perform the methods disclosed within.

After starting in block 600, the method includes for a profile specification indicating the source system 102, instantiating a corresponding thread in a profile queue 234, as shown in block 602. As shown in block 604, the method also includes instantiating, by the corresponding thread, a profile engine 214 to parse the profile specification 208 and execute at least one handler (e.g., extraction handler 212) to provide extracted file identification information and extracted structure information from the source system 102. The handler may be, for example, an application on the one or more processing devices 202 that interfaces between the profile engine 214 and the target system 104. Next, as shown in block 606, the method includes, before ending in block 608, providing, by the profile engine 214, a batch specification 230 including the extracted file identification information (e.g. which files to be extracted and injected, and other information as further discussed above) and the extracted structure information (e.g., folders, cabinets, etc. as further discussed above) in a standardized format. A standardized format allows the profile engine 214 to interpret and process the information from a source system 102, regardless of the structure of the content on the source system 102. One example of a standardized format is the XML format.

Because the source system 102 and the target system 104 may not be compatible, or if the files on the source system 102 are being migrated to multiple target systems that are not compatible, standardizing the format facilitates transfer. The handler, such as extraction handler 212, is designed to interface with the source system 102.

The method may also include additional steps. For example, as shown in dotted outlines in FIG. 6, block 610 asks whether there is another thread in the profile queue. If there is not anther thread in the profile queue, then the method ends in block 608. If there is another thread in the profile queue, then the method may loop back to block 604, as shown. It is also contemplated, although not shown, that the method may include instantiating another corresponding thread in the profile queue for another profile specification indicating a second source system.

As another example, the method may also include executing at least one handler to provide extracted file metadata information. For example, different files or folders on a source system 102 may contain file metadata information. For example, metadata information associated with a content file may include, among other things, physical properties such as creation date, format, and content size. Metadata information may also include business properties, such as authors, keywords, title, and/or subject. File metadata information, however, may be stored in different formats depending on the platform of the source system 102. The extraction handler 212, however, is customized to extract file metadata information from the particular source system 102. The profile engine 214 includes the extracted file metadata information in the batch specification.

Figure 7:
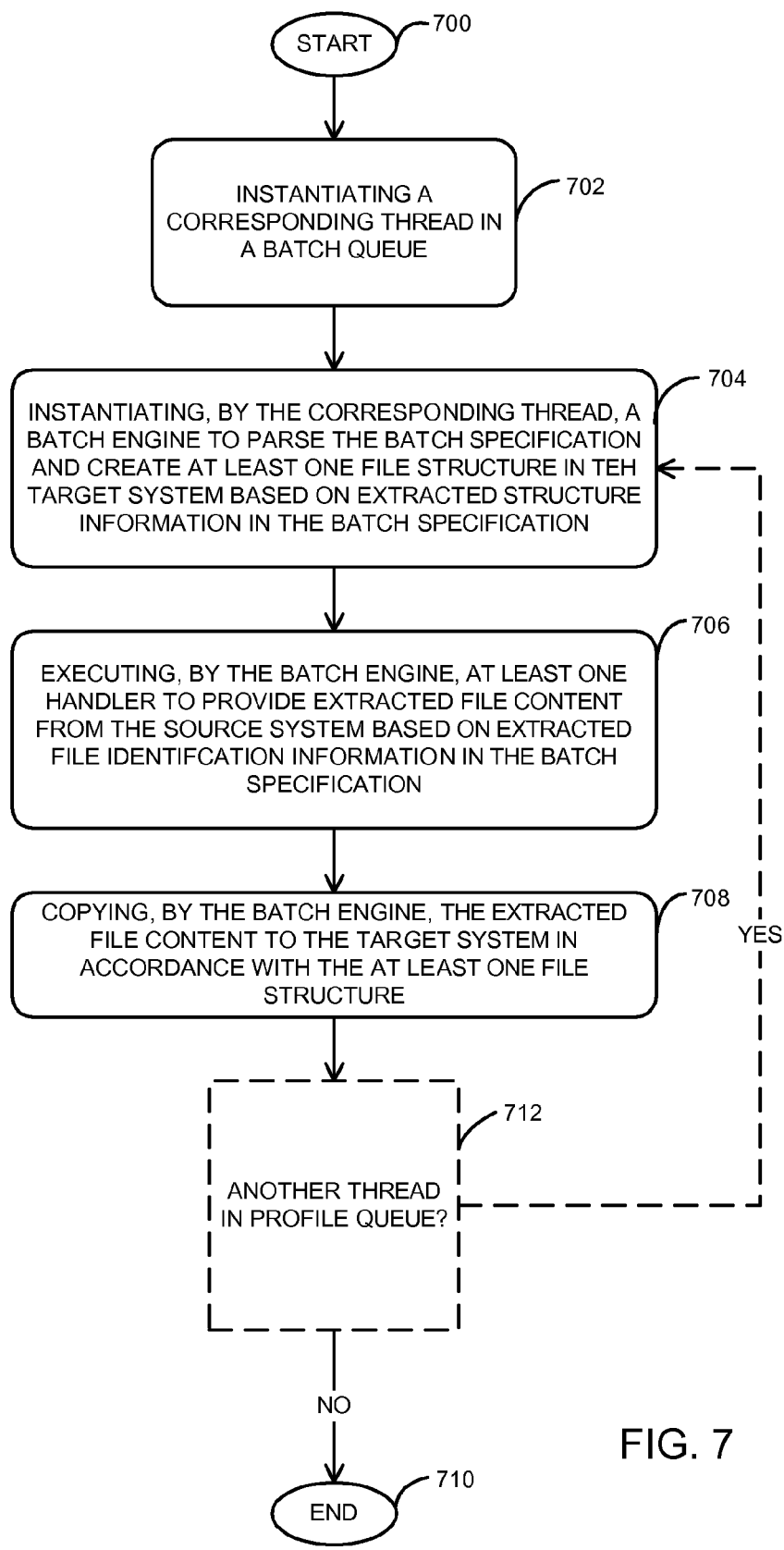
FIG. 7 is a flowchart illustrating another method for facilitating file migration from a source system to a target system in accordance with an embodiment described herein.

Another method for facilitating migration of files between a source system 102 and a target system 104 is shown in FIG. 7. Although this method could be performed by a device similar to device 204, the method may be performed by any suitable device, system, or apparatus. As shown in block 702, the method includes, for a batch specification 230 (e.g., an XML file) indicating the target system 104, instantiating a corresponding thread in a batch queue 412. As shown in block 704, the method includes instantiating, by the corresponding thread, a batch engine 404 to parse the batch specification 230 and create at least one file structure in the target system 104 based on extracted structure information in the batch specification 230. It is understood that the batch specification may be created by an extraction component 106 as described above or by any other suitable extraction technique.

As shown in block 706, the method includes executing, by the batch engine 404, at least one handler 402 to provide extracted file content from the source system 102 based on extracted file identification information in the batch specification 230. Because each source system 102 may be unique (e.g., it could be a proprietary system of which no similar system exists), the handler 402 may be customized to communicate with the particular source system 102. Next, as shown in block 708, the method includes copying, by the batch engine 404, the extracted file content to the target system 104 in accordance with the at lest one file structure. Each target system 104 may be based on a unique platform. The extraction component 106, however, standardizes the information from the source system 102, and the injection component 108 is customized to use this standardized information to inject the information into the target system 104.

As shown in optional (as indicated by dotted lines) decision block 710, the method may also include going back to the step shown in block 702 if another thread exists in the batch queue 412, i.e., instantiating another corresponding thread in the batch queue 412 for another batch specification 230 indicating the target system 104 (or another target system, if desired).

As discussed throughout, the method may include any additional suitable steps before, after, or between the steps shown in FIG. 7. For example, the method may further include updating, by the batch engine 404, metadata in the target system 104 based on extracted file metadata information in the batch specification 230. The extracted file metadata information in the batch specification 230 is in a standardized format so that the batch engine 404 may be customized to update metadata on a target system 104, regardless of the particular platform that the target system 104 utilizes. It is also contemplated that the method may include instantiating another corresponding thread in the batch queue 412 for another batch specification 230 indicating a second target system. As yet another example, before initiation of a migration process, the content and metadata on the source system 102 that is identified for migration may be frozen (i.e., set to not allow writes so that the data cannot be changed). This ensures that changes to content and/or metadata are not lost during a content migration process.

Figure 8:
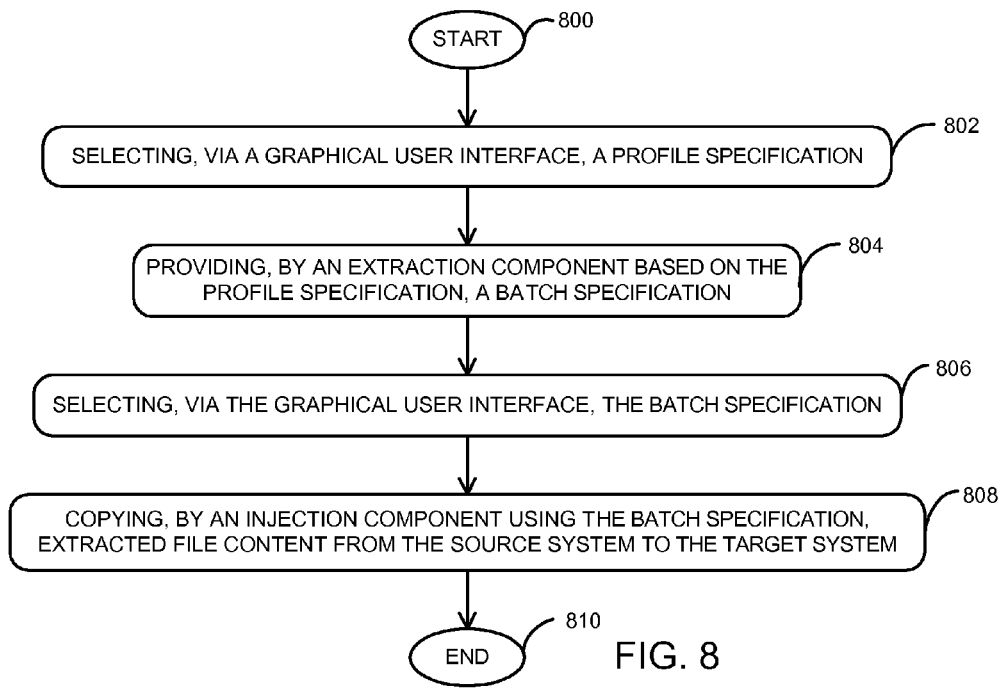
FIG. 8 is a flowchart illustrating yet another method for facilitating file migration from a source system to a target system in accordance with an embodiment described herein.
Figure 9:
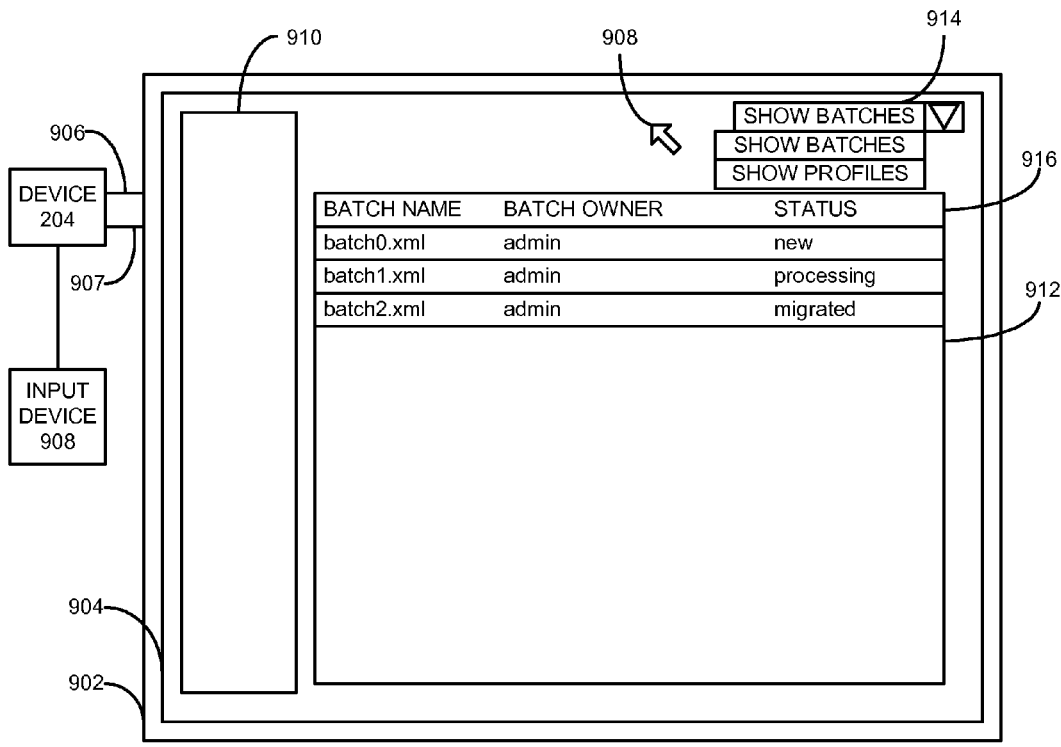
FIG. 9 is an illustration of a graphical user interface that may be used to facilitate file migration from a source system to a target system in accordance with an embodiment described herein.

Yet another method may be better understood in view of FIGS. 8 and 9. As shown in block 802, the method includes selecting, via a graphical user interface, a profile specification (i.e., selecting a visual representation of a profile specification) on the graphical user interface. In one example, as shown in FIG. 9, this may be done on a display 902 operatively coupled to device 204. The display 902 may be integrated into the device 204 (e.g., share the same housing as the other components of device 204), or display 902 may be separate and connected by a cable, a wireless network, or any suitable means. Display 902 also includes graphical user interface ("GUI") 904, which may display information received as display data 906 from the device 204. It is also contemplated, among other things, that display 902 may be a touch screen display, thereby functioning as an input device and capable of sending user response data 907 back to device 204. A user may interact with the GUI 904 via any suitable means, such as by a mouse pointer 908 controlled by an input device 910 (e.g., a mouse, keyboard, or any suitable input device known in the art).

GUI 904 may optionally include a folder and cabinet listing 910, which may list files and other information related to the source system 102, the target system 104, or any other system. Furthermore, GUI 904 may include a specification (e.g., a batch specification or profile specification) listing window 912. In this particular example, drop-down box 914 allows a user to select whether to show profile specifications 220 to use for an extraction operation or batch specifications 230 to use for an injection operation. It is understood, however, that any suitable implementation may be used. For example, GUI 904 may have only one type of specification listing or may have multiple specification listing windows 912 for each type of specification (e.g., profile specification or batch specification). In the example shown in FIG. 9, the specification listing window 912 contains a title bar 916 and three example representations of batch specifications 230 (batch0.xml, batch1.xml, batch2.xml). Other information may be displayed showing additional information relating to each batch specification 230.

For example, the batch owner may be displayed. As another example, the status of each batch specification may be displayed, as shown. In the example shown, the specification listing window 912 shows a listing of three batch specifications (batch0.xml, batch1.xml, batch2.xml). Each batch specification is owned by a user named "admin," as shown. Users of a system may have different permissions regarding each batch specification. In one embodiment, different batch specifications may be owned by different users, and only an owner may access a particular batch specification based.

Furthermore, as shown, each batch specification has an associated status, which, among other things, indicates to a user whether an injection operation has occurred using the particular batch specification. For example, the batch0.xml batch specification has a status of "new," which indicates to a user that a file migration has not yet occurred using this particular batch specification. The batch1.xml batch specification has a status of "processing," which indicates that a file migration between a source system and a target system is currently taking place. A user may, among other things, be able to abort the migration, pause the migration, or throttle the migration. By throttling the migration, a user may be able to control the amount of resources (e.g., processing power, memory, or other resources associated with the source system, the target system, or the system performing the migration). The batch2.xml batch specification includes a status of "migrated," which indicates that a file migration corresponding to the batch2.xml batch specification has occurred. After the status has changed to "migrated," a user may be able to, among other things, view logs documenting the migration process. By viewing the logs, the user may verify that the migration was successful. Alternatively, a review of the migration may be performed by one or more processing devices and may be automated. Such a verification may occur before the status is changed to "migrated" or may be performed when requested by a user after the status is shown as "migrated." Other status indications may also be used. For example, a status of "error" may indicate that a problem occurred during a file migration. A user may then be able to view an error message to investigate and correct any problems.

Turning back to the example method and as shown in block 804, the method includes providing, by an extraction component 106 and based on the profile specification selected via the graphical user interface, a batch specification. Next, as shown in block 806, the method includes selecting, via the graphical user interface 904 a batch specification. The selected batch specification could be the one just created or could be any desired batch specification. Then as shown in block 808, the method includes copying, by an injection component 108 using the batch specification, extracted file content from the source system 102 to the target system 104.

As one skilled in the art will appreciate this disclosure addresses issues and problems with the complex and crucial process of migrating files and solves many of the problems associated therewith. For example, file migration often involves migrating voluminous amounts of content and/or the migration may involve multiple source and/or target systems. As such, running a complete migration (i.e., migrating all files from the source system to the target system in one step) may tie up resources for extended periods of time. Based on the information disclosed herewith, however, the migration process is bifurcated into an extraction component and an injection component. It is also noted that neither the extraction nor the injection have to extract/inject all of the files to be migrated from the source system. Furthermore, this bifurcation allows the migration process to be broken down and implemented at more convenient times. For example, a user may extract information for creating a batch specification for only a portion of the files on the source system, which could be done, for example, during non-business hours. The next night (e.g., the next period of non-business hours) could then be used to complete the injection process. Other variations to the disclosure exist that facilitate the file migration. For example, the various operations (e.g., extraction/injection) may be logged and audited, thereby allowing customers to have accountability and visibility for the ECM process.

While particular embodiments have been shown and described, it will be obvious to those skilled in the art that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A method, comprising:
receiving, by a device, profile information associated with a source system;
extracting, by the device and from the profile information:
file identification information and file structure information associated with content, of the source system,
browser information associated with browsing directory hierarchies of the source system,
content information associated with retrieving the content of the source system, and
attribute information associated with retrieving data corresponding to the content of the source system, the data including a property pertaining to the content, the property including one or more of author information and keyword information;
presenting, by the device, the content and the data for display based on one or more of the file identification information and file structure information, the browser information, the content information, and the attribute information;
receiving, by the device, a selection of content and data, from the presented content and data, to be copied to the target system;
creating, by the device and based on the selection, a batch file that includes file identification information and file structure information for the selected content and data; and
executing, by the device, the batch file to cause the selected content and data to be copied to the target system.

2. The method of claim 1, where the property includes the author information, the keyword information, title information and subject information.

3. The method of claim 1, further comprising:
extracting file metadata information, where the batch file further includes the extracted file metadata information.

4. The method of claim 1, further comprising:
receiving additional profile information indicating a second source system;
creating a second batch file based on the additional profile information; and
executing the second batch file to copy data associated with the second source system to the target system.

5. The method of claim 1, further comprising:
creating another batch file that includes file identification information and file structure information to be copied to the target system.

6. The method of claim 1, where extracting from the profile information further comprises:
parsing the profile information.

7. The method of claim 6, where parsing the profile information further comprises:
utilizing a profile engine to parse the profile information; and
utilizing at least one handler to extract the file identification information from the source system.

8. The method of claim 1, where executing the batch file comprises:
creating a file structure in the target system based on the file structure information.

9. A device, comprising:
one or more processors to:
receive profile information associated with a first system;
extract, from the profile information:
file identification information and file structure information associated with content, of the first system,
browser information associated with browsing directory hierarchies of the first system,
content information associated with retrieving the content of the first system, and
attribute information associated with retrieving data corresponding to the content of the first system, the data including a property pertaining to the content, the property including one or more of author information and keyword information;
present the content and the data for display based on one or more of the file identification information and file structure information, the browser information, the content information, and the attribute information;
receive a selection of content and data, from the presented content and data, to be copied to the second system;
create, based on the selection, a batch file that includes file identification information and file structure information for the selected content and data; and
execute the batch file to cause the selected content and data to be copied to the target system.

10. The device of claim 9, where the property includes the author information, the keyword information, title information and subject information.

11. The device of claim 9, where the one or more processors are further to:
extract, from the profile information, file metadata information, where the batch file further includes the extracted file metadata information.

12. The device of claim 9, where the one or more processors are further to:
receive additional profile information indicating a second source system;
create a second batch file based on the additional profile information; and
execute the second batch file to copy data associated with the second source system to the target system.

13. The device of claim 9, where, when extracting from the profile information, the one or more processors are further to:
parse the profile information.

14. The device of claim 13, where, when parsing the profile information, the one or more processors are further to:
utilize a profile engine to parse the profile information; and
utilize one or more handlers to extract the file identification information from the source system.

15. The device of claim 9, where when executing the batch file the one or more processors are further to:
parse the batch file; and
create a file structure in the target system based on the file structure information and based on the parsed batch file.

16. A non-transitory computer-readable medium storing instructions, the instructions comprising:
one or more instructions that, when executed by one or more processors of a device, cause the one or more processors to:

receive profile information associated with a source system;
extract, from the profile information:
file identification information and file structure information associated with content, of the source system,
browser information associated with browsing directory hierarchies of the source system,
content information associated with retrieving the content of the source system, and
attribute information associated with retrieving metadata corresponding to the content of the source system, the metadata including a property pertaining to the content, the property including one or more of author information and keyword information;
present the content and the metadata for display based on one or more of the file identification information and file structure information, the browser information, the content information, and the attribute information;
receive a selection of content and metadata, from the presented content and metadata, to be copied to the target system;
create, based on the selection, a batch file that includes file identification information and file structure information for the selected content and metadata; and
execute the batch file to cause the selected content and metadata to be copied to the target system.

17. The non-transitory computer-readable medium of claim 16, where the property includes the author information, the keyword information, title information, and subject information.

18. The non-transitory computer-readable medium of claim 16, where the one or more instructions that, when executed by the one or more processors, further cause the one or more processors to:
extract, from the profile information, file metadata information, where the batch file further includes the extracted file metadata information.

19. The non-transitory computer-readable medium of claim 18, where the one or more instructions to extract from the profile information include one or more instructions that, when executed by the one or more processors, further cause the one or more processors to:
parse the profile information for the file metadata information.

20. The non-transitory computer-readable medium of claim 19, where the one or more instructions to parse the profile information include one or more instructions that, when executed by the one or more processors, further cause the one or more processors to:
utilize a profile engine to parse the profile information; and
utilize one or more handlers to extract the file identification information from the source system.

* * * * *